US011983651B2

(12) United States Patent
Musset et al.

(10) Patent No.: US 11,983,651 B2
(45) Date of Patent: May 14, 2024

(54) MANAGING PRODUCTION PIPELINES

(71) Applicant: Palantir Technologies Inc., Denver, CO (US)

(72) Inventors: Adrien Musset, Paris (FR); Benjamin Ahnert, London (GB); Jakub Pilch, New York, NY (US); Marie Inuzuka, San Francisco, CA (US); Marie Kindblom, London (GB); Neha Rathi, Fort Myers, FL (US)

(73) Assignee: Palantir Technologies Inc., Denver, CO (US)

( * ) Notice: Subject to any disclaimer, the term of this patent is extended or adjusted under 35 U.S.C. 154(b) by 134 days.

(21) Appl. No.: 17/446,236

(22) Filed: Aug. 27, 2021

(65) Prior Publication Data

US 2022/0067609 A1 Mar. 3, 2022

(30) Foreign Application Priority Data

Aug. 28, 2020 (GB) ...................................... 2013583

(51) Int. Cl.
*G06Q 10/0631* (2023.01)
(52) U.S. Cl.
CPC .............................. *G06Q 10/06312* (2013.01)
(58) Field of Classification Search
None
See application file for complete search history.

(56) References Cited

U.S. PATENT DOCUMENTS

| 7,216,086 B1 | 5/2007 | Grosvenor et al. |
| 2003/0033179 A1* | 2/2003 | Katz ................. G06Q 10/0631 705/7.41 |

(Continued)

FOREIGN PATENT DOCUMENTS

EP 3961523 3/2022

OTHER PUBLICATIONS

I. Zinnikus et al., "A collaborative virtual workspace for factory configuration and evaluation," 9th IEEE International Conference on Collaborative Computing: Networking, Applications and Worksharing, Austin, TX, USA, 2013, pp. 353-362, doi: 10.4108/icst.collaboratecom.2013.254053 (Year: 2013).*

(Continued)

*Primary Examiner* — Stephanie Z Delich
(74) *Attorney, Agent, or Firm* — Knobbe, Martens, Olson & Bear, LLP

(57) ABSTRACT

A method for management of a production pipeline is disclosed. The method may comprise accessing a data model which comprises a plurality of data objects, including one or more assembly objects, each assembly object representing a part to undergo one or more production events to be performed on a part at a first party facility for providing to a second party facility and one or more production event objects, each production event object representing a particular production event and having a plurality of properties, including an associated start time property and an end time property. The method may also comprise receiving selection of one or more production event objects to be linked to a first assembly object and an indication of values for at least the start time property and end time property of the one or more production event objects and receiving input of one or more alert conditions to be linked to the first assembly object. The method may also comprise receiving first input data in relation to one or more of the production event objects that modifies one or both of the start and end time values and determining that the modification meets an alert condition linked to the assembly object. The method may also comprise issuing an alert to a user interface responsive to the determination.

20 Claims, 11 Drawing Sheets

(56) References Cited

U.S. PATENT DOCUMENTS

| | | | |
|---|---|---|---|
| 2003/0074355 A1* | 4/2003 | Menninger | G06Q 10/06 707/999.009 |
| 2003/0149578 A1* | 8/2003 | Wong | G06Q 10/087 705/7.22 |
| 2007/0203770 A1* | 8/2007 | Grosvenor | G06Q 10/063 705/7.11 |
| 2008/0004740 A1* | 1/2008 | Tamarkin | G06Q 10/06 700/106 |
| 2010/0161364 A1* | 6/2010 | Lokowandt | G06Q 10/087 705/28 |
| 2010/0161366 A1* | 6/2010 | Clemens | G06Q 30/06 705/7.29 |
| 2010/0306011 A1* | 12/2010 | Correll | G06Q 10/0635 715/810 |
| 2017/0201425 A1 | 7/2017 | Marinelli et al. | |
| 2017/0236221 A1* | 8/2017 | Davidson | G06Q 30/0633 705/7.23 |
| 2020/0143314 A1 | 5/2020 | Bajaj et al. | |
| 2022/0019204 A1* | 1/2022 | Maury | G05B 19/41805 |

OTHER PUBLICATIONS

Official Communication for European Patent Application No. 21193661.2 dated Jan. 31, 2022, 10 pages.

* cited by examiner

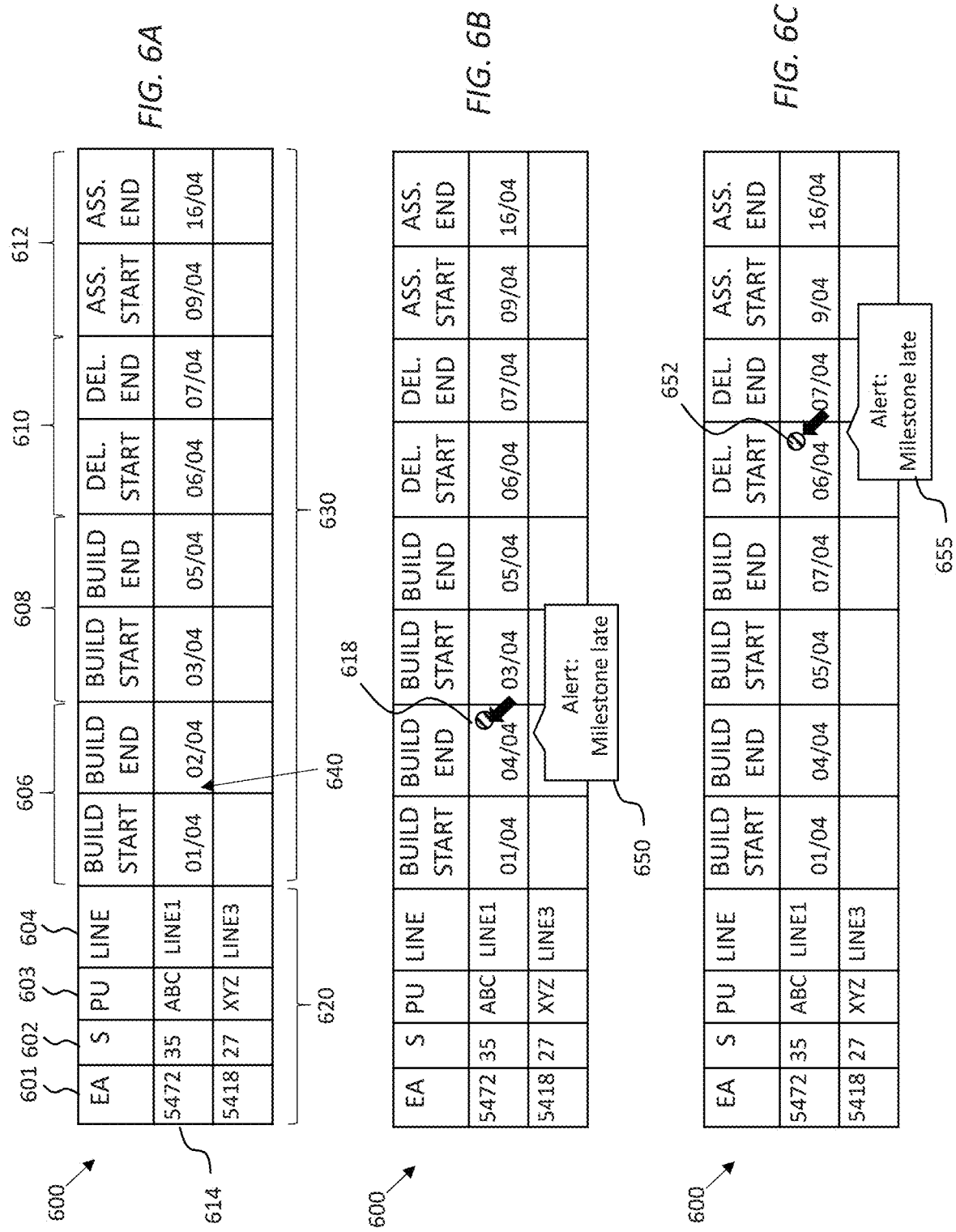

FIG. 6D

| EA | S | PU | LINE | BUILD START | BUILD END | BUILD START | BUILD END | DEL. START | DEL. END | ASS. START | ASS. END |
|---|---|---|---|---|---|---|---|---|---|---|---|
| 5472 | 35 | ABC | LINE1 | 01/04 | 04/04 | 05/04 | 07/04 | 08/04 | 09/04 | 09/04 | 16/04 |
| 5418 | 27 | XYZ | LINE3 | | | | | | | | |

| EA | S | PU | LINE | BUILD START | BUILD END | BUILD START | BUILD END | DEL. START | DEL. END | ASS. START | ASS. END |
|---|---|---|---|---|---|---|---|---|---|---|---|
| 5472 | 35 | ABC | LINE1 | 01/04 | 01/04 | 02/04 | 03/04 | 06/04 | 07/04 | 09/04 | 16/04 |
| 5418 | 27 | XYZ | LINE3 | | | | | | | | |

662
664
668 Alert: Too Early

FIG. 10A

| EA | S | PU | LINE | BUILD START | BUILD END | BUILD START | BUILD END | DEL. START | DEL. END | ASS. START | ASS. END |
|---|---|---|---|---|---|---|---|---|---|---|---|
| 5472 | 35 | ABC | LINE 1 | 01/04 | 04/04 | 05/04 | 07/04 ⊘ | 06/04 | 07/04 | 10/04 | 16/04 |
| 5418 | 27 | XYZ | LINE 3 | | | | | | | | |
| 5472 | 27 | ABC | LINE 6 | 30/03 | 01/04 | 03/04 | 05/04 | 07/04 | 10/04 | 12/04 | 19/04 |
| 5418 | 27 | XYZ | LINE 4 | | | | | | | | |
| 5472 | 27 | ABC | LINE 9 | 28/03 | 29/03 | 02/04 | 05/04 | 08/04 | 11/04 | 12/04 | 19/04 |

FIG. 10B

| EA | S | PU | LINE | BUILD START | BUILD END | BUILD START | BUILD END | DEL. START | DEL. END | ASS. START | ASS. END |
|---|---|---|---|---|---|---|---|---|---|---|---|
| 5472 | 35 | ABC | LINE 6 | 30/03 | 01/04 | 03/04 | 05/04 | 06/04 | 07/04 | 10/04 | 16/04 |
| 5418 | 27 | XYZ | LINE 3 | | | | | | | | |
| 5472 | 27 | ABC | LINE 9 | 28/03 | 29/03 | 02/04 | 05/04 | 07/04 | 10/04 | 12/04 | 19/04 |
| 5418 | 27 | XYZ | LINE 4 | | | | | | | | |
| 5472 | 27 | ABC | LINE 1 | 01/04 | 04/04 | 05/04 | 07/04 | 08/04 | 11/04 | 12/04 | 19/04 |

MANAGING PRODUCTION PIPELINES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 for all purposes and for all that they contain.

TECHNICAL FIELD

This disclosure relates to approaches, e.g. methods, systems and computer-readable media storing computer-readable code for management of production pipelines, which may include, but not is not necessarily limited to, providing a user interface for management of a parts production pipeline which extends across a plurality of parties.

BACKGROUND

Under conventional approaches, a processing pipeline which represents a chain of production events, typically a sequential chain of production events, is managed based on individual communications between different parties involved in the chain through conventional communication methods such as emails, facsimile, telephone, and so on. Those conventional approaches may be inefficient to manage the coordination of production events because human agents typically have to go through each of the communications and determine statuses, updates and the potential knock-on effects therefrom.

SUMMARY

According to a first aspect, example embodiments disclose a method for management of a production pipeline, the method comprising: accessing a data model which comprises a plurality of data objects, including: one or more assembly objects, each assembly object representing a part to undergo one or more production events to be performed on a part at a first party facility for providing to a second party facility; and one or more production event objects, each production event object representing a particular production event and having a plurality of properties, including an associated start time property and an end time property; receiving selection of one or more production event objects to be linked to a first assembly object and an indication of values for at least the start time property and end time property of the one or more production event objects; receiving input of one or more alert conditions to be linked to the first assembly object; receiving first input data in relation to one or more of the production event objects that modifies one or both of the start and end time values; determining that the modification meets an alert condition linked to the assembly object; and issuing an alert to a user interface responsive to the determination.

The method may further comprise causing the user interface to be displayed on first and second computing systems, respectively associated with the first party and the second party, the user interface including a status list including one or more entries, wherein each entry corresponds to an assembly object, including a first entry associated with the first assembly object and, associated with the first assembly object, an indication of the one or more production event objects linked to the first assembly object, including their start and end time values.

The production event objects may be shown in chronological order. Selection of the one or more production events, including the indication of start time and end time values, and the input of alert conditions, may be receivable from both of the first and second computing systems whilst being restricted to production event objects identified as performed at their own respective facilities.

The first assembly object may be linked to first and second sequential production event objects in which the start time value of the second production event object is dependent on the end time value of the first production event object, and the second production event has a predetermined duration, wherein, responsive to the received first input data modifying the end time value of the first production event, the start and end time values of the second production event are automatically modified forwards or backwards in time by the predetermined duration and indicated on the user interface.

One of the production event objects linked to the first assembly object may be a forecasted delivery time for an assembly object, having start and end times dependent on an end time of one or more preceding production event objects, and another of the production event objects is a requested delivery time slot, received from the second party for the first assembly object, and wherein the alert condition may be such as to cause an alert to be issued if the forecasted delivery time is modified by the first input data so as to be outside of the requested delivery time slot.

The method may further comprise receiving second input data from the second party which modifies the requested delivery time slot such that the current forecasted delivery time for the assembly object moves from inside to outside of the modified requested delivery time slot, and responsive thereto, causing an alert to be issued to the user interface.

The requested delivery slot object may comprise a start time and an end time, and the predefined alert condition is such as cause an early alert to be issued if the forecasted delivery time is before the requested delivery slot start time and a late alert if after the requested delivery slot end time.

The first input data may be received from a computing system associated with the first party and corresponds to an updated status property of one of the production event objects.

The updated status property of the production event object may be indicative of the assembly failing one of a functional test and a quality control test.

The updated status property may be received automatically from a computerized testing system.

The updated status property may be indicative of the assembly not matching a requirement specification for the assembly provided by the second party.

The updated status property may have a corresponding delay time associated with said status property, which delay time is used to determine a modified end time for the production event object.

The method may further comprise storing a log indicative of received input data in chronological order of receipt, including the first or second party from whom it was received.

The method may further comprise: receiving identification via the user interface of an assembly object A having an alert indicative of a non-compliance event; determining, using a second object model which maps assembly objects to one or more functionally-equivalent assembly objects, one or more second assembly objects B currently at the first party facility which is or are functionally-equivalent to the first assembly object; indicating said functionally-equivalent assembly objects on the user interface; receiving, via the user interface, selection of one of said second assembly objects B for replacing assembly object A; generating an updated user interface showing the selected, second assembly object B in place of the assembly object A, including modified downstream effects to one or more other assembly objects and/or production event objects which are dependent on assembly object A, due to the replacement.

Responsive to the selection, the assembly object A may replace the second assembly object B.

Responsive to the selection, a swap list interface may be generated for creation of a closed-loop set of replacements involving three or more functionally-equivalent assembly objects, the method further comprising receiving selection of another one of said second assembly objects B' to replace assembly object B, and so on until assembly object A is used to replace a replaced assembly object.

The method may further comprise, prior to receiving selection of one of said second assembly objects B, determining a subset of said second assembly objects B which, if selected, would undo the non-compliance event for assembly object A, and filtering the user interface to enable only said subset to be selectable for replacing assembly object A.

The updated user interface may be generated as a separate data object or file which replaces the previous user interface after a confirm selection is received in relation to the updated user interface.

According to a second aspect, this specification discloses a system comprising one or more processors and memory storing instruction, when executed by the one or more processors, is configured to: provide a first data model which comprises a plurality of data objects, including:

one or more assembly objects, each assembly object representing a part to undergo one or more production events to be performed on a part at a first party facility for providing to a second party facility; and one or more production event objects, each production event object representing a particular production event and having a plurality of properties, including an associated start time property and an end time property; receive selection of one or more production event objects to be linked to a first assembly object and an indication of values for at least the start time property and end time property of the one or more production event objects; receive input of one or more alert conditions to be linked to the first assembly object; receive first input data in relation to one or more of the production event objects that modifies one or both of the start and end time values; determine that the modification meets an alert condition linked to the assembly object; and issuing an alert to a user interface responsive to the determination.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIGS. 6A-6E show example partial graphical user interfaces (GUIs) according to some embodiments.

FIGS. 10A and 10B illustrate a swap proposal GUI indicating a closed-loop swap scenario involving functionally-equivalent assembly objects, in accordance with some embodiments;

DETAILED DESCRIPTION

Figure 1B:
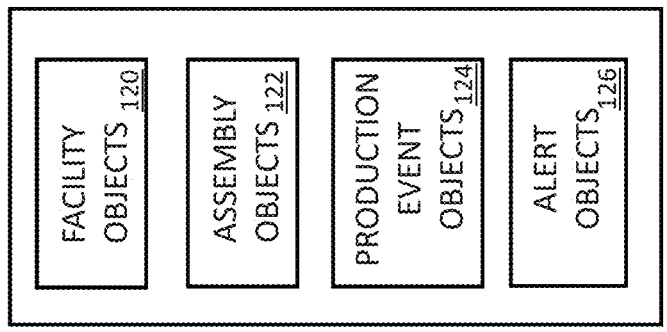
FIG. 1B illustrates an example of data object types which may be stored in a resource repository of the FIG. 1A system.

A claimed solution rooted in computer technology overcomes problems specifically arising in the realm of computer technology.

In various implementations, a computing system is configured to provide a production pipeline management method and system. The method and system may correspond to management of a production pipeline that extends across a plurality of parties, e.g. first and second parties, and possibly additional parties. The method and system in some embodiments may be linked to an allocation and/or de-allocation computer system at one or more respective facilities of the first and second parties to issue control signals and/or other data to said allocation and/or de-allocation computer system, in order to automatically allocate and/or de-allocate physical resources based on modifications (or "updates") made to pipelines made via the methods and systems described herein.

A production pipeline comprises a chain of production events, typically a sequential chain of production events, but may also comprise one or more production events in parallel with one or more other production events if two events can occur with some time overlap. Example embodiments focus on parts manufacture and supply, but it will be appreciated that other embodiments can involve alternative entities that move between entities in a supply chain setting. Making a part may be considered an example of a production event. Another example may comprise dispatching, delivering or shipping a part from a first party facility to a second party facility, the two facilities being physically and possibly legally distinct, or at least having distinct functions. The first party may be a parts supplier and the second party may be one or more of an assembler, an end customer or even another supplier downstream of the first party supplier in the supply chain. Other production events may be associated with the second, downstream party, e.g. relating to a requested delivery slot from the second party to the first party, or the actual assembly of the received part to a larger, complex article, by the second party. In this respect, a downstream party may be receiving multiple parts from multiple suppliers to assemble a complex article. The method and system may, in some embodiments, provide a user-configured model of at least part of the production pipeline, and a graphical user interface (GUI) for presenting user-defined alerts associated with one or more parts of the model, and, in some embodiments, the GUI may show data objects representing elements of the production pipeline in relation to entries which represent parts, or "assemblies" as they may be referred to herein. The GUI may be provided to, or is accessible to, computing systems of a plurality of the parties so that the two or more parties involved in different aspects of the pipeline, e.g. a first party and a second party, have a consistent and coordinated view of the pipeline relevant to their combined operations and also a view of any updates made by one or both of them, and knock-on effects of those updates to dependent assemblies or production events. It may provide a way of modelling a production pipeline, visualizing statuses, identifying potentially problematic scenarios at an early stage, and issuing alerts via the GUI, for example in response to a requested modification by one or more of the parties. The system and GUI is extendible to three or more parties, for example to the extent that their data relates to one or more common assemblies.

The following definitions may be referred to herein.

A facility is a station or location that an assembly at some point will pass through, and may comprise a factory, an engineering or assembly plant, an assembly line, or part thereof, to give just some examples. It may be represented in a data model as a facility object, which may be, for example, a JSON object or similar.

An assembly is a physical item, such as a mechanical and/or electronic part, that undergoes one or more production events. For example, an assembly can be a mechanical and/or electrical part to be assembled into a final mechanical and/or electrical article. An assembly may have properties associated with it, for example an assembly identifying dataset which can include an identifier referencing an assembly, an identifier referencing an end article for which the assembly is used, an identifier referencing a section of the end article at which the assembly is used, and an identifier of a production line to which the assembly is to be delivered. An assembly is represented in a data model as an assembly object, which may be, for example, a JSON object or similar. An assembly object may be linked to one or more facility objects, e.g. to a first supplier facility object that represents who makes the assembly, and to a second assembler facility object that represents who assembles the assembly. In this way, two or more parties can track a specific assembly using its identification code in all facilities it is linked to, via their linked facility objects, and manage which parties (associated with particular facilities) can access data on respective GUIs and which cannot. An access control list (ACL) or similar may be employed for this purpose.

A production event is an event that has, or is planned to occur, in relation to a specific assembly. A production event may be represented in a data model as a production event object, which may be, for example, a JSON object or similar. The production event object may have properties associated with it, for example milestone properties which may comprise a start time and an end time. This helps to model the fact that a production event can span over time and consists of distinct start and end times with different dates and potentially the same date but different times within said date. Even though, for example, a shipping event may comprise "dispatching from facility A and arriving at facility B", and may therefore be seen as two events, in some example embodiments, the shipping event is considered to relate to a single shipping event and can be modelled as a single production event object using, for example, a JSON object or similar. Production event objects may also comprise one or more status properties, which may relate to things that happen or change during performance of the production event or other production events that are linked to it. For example, a test status property may be indicative of the assembly passing or failing a functional and/or quality control test. A compatibility status property may be indicative of the assembly meeting or not complying with a requirement specification of a downstream entity, e.g. the assembler party. Any of said properties may change over time, possibly due to user input and possibly due to changes to other production events linked to the particular production event, and said change in property or properties may have knock-on effects to one or potentially a large number of other production events, e.g. delivery times, time to assemble a complex assembly and so on. There may also be a knock-on to other assemblies dependent on the particular assembly concerned.

An alert is a way of alerting or notifying a user via a GUI of a predetermined condition occurring in relation to modelled objects of the pipeline. An alert is modelled as an alert object using, for example, a JSON object or similar, but may be defined in other ways, e.g. using a script. The term alert object will be used hereafter for ease of reference. An alert object may be user-configured and may comprise an identifier and rules and/or logic to define the conditions under which the particular alert object is to be enabled, e.g. to cause issuance of the alert on the GUI. An alert object may be set-up to depend in some way on a production event object of a particular assembly object. For example, an alert object may be configured to issue an alert to the GUI if the end time value of a production event object is moved to be after, or within a predetermined threshold of, the start time of production event object, where the latter is dependent on the former. An alert object may also be configured to have an assigned rank or level of alert, where higher ranking alerts are indicated differently than lower ranging alerts. For example, different colours or shadings can be used.

In overview, example embodiments provide methods and systems for visualization and management of a production pipeline. The method may comprise accessing a first data model which comprises a plurality of data objects, including: one or more assembly objects, each assembly object representing a part to undergo one or more production events to be performed on a part at a first party facility for providing to a second party facility, and one or more production event objects, each production event object representing a particular production event and having a plurality of properties, including an associated start time property and an end time property.

A selection may be received of one or more production event objects to be linked to a first assembly object and an indication of values for at least the start time property and end time property of the one or more production event objects.

Input of one or more alert objects to be linked to the first assembly object may also be received, the alert object defining one or more alert conditions.

Input data in relation to one or more of the production event objects that modifies one or both of the start and end time values may be received and, if the modification meets an alert condition linked to the assembly object, an alert may be issued to a user interface responsive to the determination.

In some example embodiments, a software tool, application or plug-in may be used at first and second party computing systems for accessing the pipeline management system to perform the method described herein. This is so that respective users of said first and second party computing systems may build and configure at least part of a production pipeline model appropriate to their operations, by means of selecting and configuring one or more assembly objects and associating one or more production event objects with the one or more assembly objects. The selected objects may be blank objects having default or blank property fields which may then be edited or configured by the user. Editing may be performed via the GUI, for example using alphanumeric input and/or drag-and-drop operations in relation to, for example, a timeline or calendar, a user being able to toggle between each form of GUI. For example, a user may, via the GUI, select one or more production event objects to be linked to a first assembly object and may select or otherwise input an indication of values for the start time property and the end time property for the or each production event object. The user may add, remove or replace production event objects in relation to a current assembly object to reflect the chain of events as planned. In this way, the user may build a production pipeline model for display on the GUI in respect of one or more assemblies for which they are responsible.

Figure 1A:
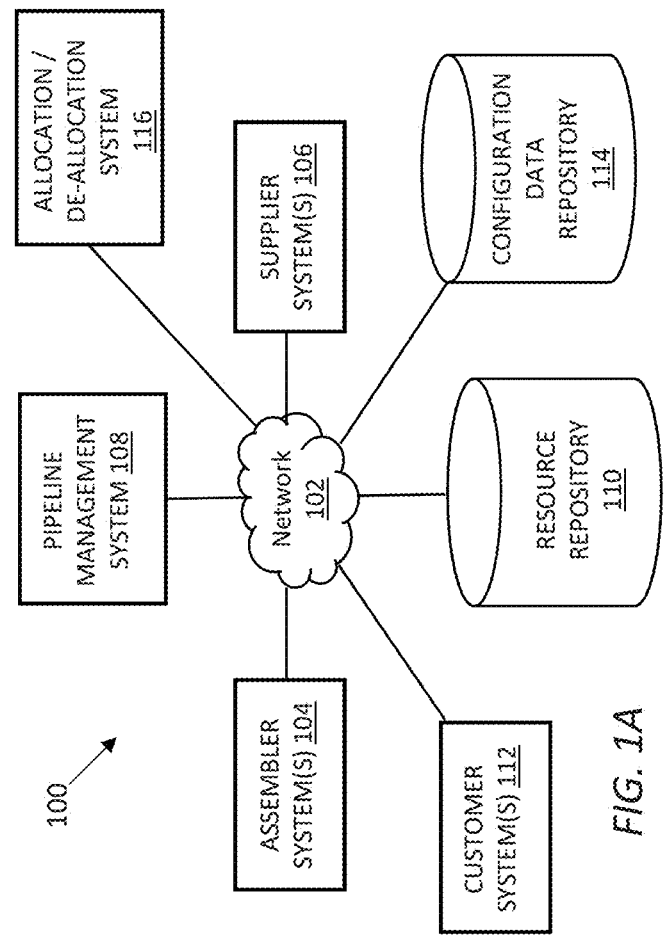
FIG. 1A illustrates an example architecture of a system according to some embodiments.

FIG. 1A illustrates an example architecture of a system 100 according to some embodiments. In the example shown in FIG. 1A, the system 100 includes one or more assembler systems 104, one or more supplier systems 106, a production pipeline management system 108, and a resource repository 110. A configuration data repository 114 may also be provided which is useful in one or both of determining compatibilities and swaps, to be described later on. The assembler systems 104, supplier systems 106, production pipeline management system 108, resource repository 110 and configuration data repository 114 are able to communicate and interact with one another over a network 102. The resource repository 110 and configuration data repository 114 are illustrated in FIG. 1A as separate from the assembler systems 104, the supplier systems 106, and the production pipeline management system 108. In implementations, the resource repository 110 and/or the configuration data repository 114 may be stored on one or more of the assembler systems 104, the supplier systems 106, and the production pipeline management system 108, or at a remote location.

In the example of the system 100 shown in FIG. 1A, the network 102 represents a computer communication network to connect various applicable computer components including those illustrated in FIG. 1A. In a specific implementation, the network 102 may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1A, as well as in other figures, different numbers of entities than those depicted may be used. Furthermore, according to various implementations, the components described herein may be implemented in hardware and/or software that configure hardware.

An allocation and de-allocation system 116 is also shown connected to the network 102. In this respect, the allocation and de-allocation system 116 represents a computing system at one or more of the facilities (whether at an assembler facility or a supplier facility) which manages allocation and de-allocation of physical resources. For example, a physical resource may comprise a machine, a loading bay, loading equipment, personnel, teams of personnel, a parking space, testing equipment and so on. Typically, there will be a limited number of such physical resources at a given facility and it is beneficial to allocate and/or allocate such resources based on, for example, the timing of when a particular assembly is to be received at the facility. Based on one or more of what the assembly is, when it is being delivered, who it is being delivered by, and what needs to happen next to it, appropriate physical resources can be reserved based on control signals or data identifying said assembly, received from the pipeline management system 108. Where timings change due to updating events, currently reserved resources can be freed-up (de-allocated) and made available to other assemblies.

In the example of the system shown in FIG. 1A, the assembler system 104 represents a computer system configured to interact with the production pipeline management system 108 to obtain data for presenting a user interface for managing, for example, parts production and delivery statuses and present the user interface to an assembler that assembles parts units delivered thereto to produce an end article. In some embodiments, an assembler may be a manufacturer and/or a builder, and the end article may be a heavy industry product such as a vehicle and airplane, a consumer product such as an electronic device and home appliances, or a construction structure.

Figure 11:
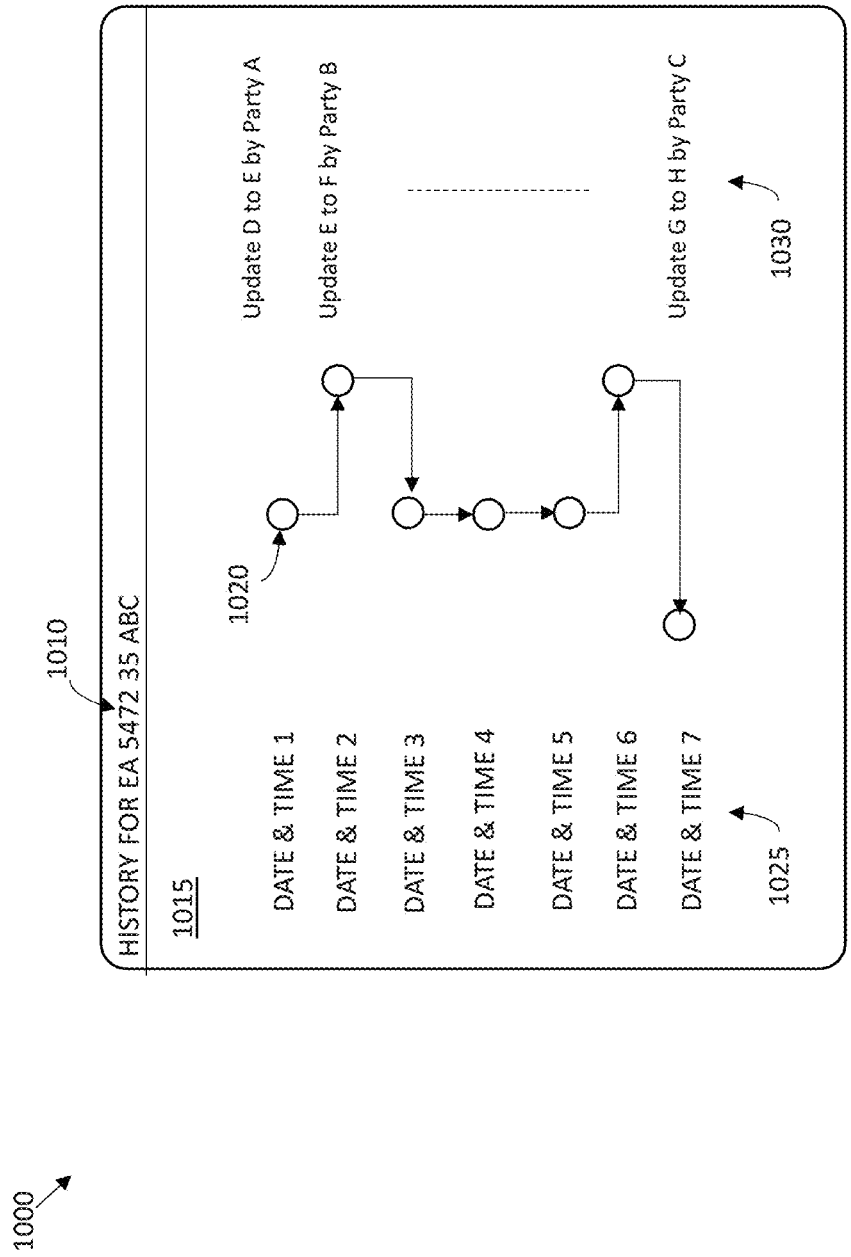
FIG. 11 is a GUI is shown for presenting logs of updates, in accordance with some embodiments.

In some embodiments, one or more of the assembler system(s) 104 is configured as a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to generate and/or receive and send datasets associated with the user interface for managing parts production and delivery statuses. In a specific implementation, one or more of the assembler system(s) 104 includes one or more processors, one or more storage devices, and/or other components. In some embodiments, the processors are programmed by one or more computer program instructions stored on a storage device. As used herein, for convenience, the various applicable instruction modules will be described as performing an operation, when, in fact, various applicable instructions program the processors (and therefore computer system) to perform the various applicable operations. Further details and features of a computer system configured for implementing features of the described invention may be understood with respect to computer system 1100 as illustrated in FIG. 11.

In the example of the system 100 shown in FIG. 1A, the supplier system 106 represents a computer system configured to interact with the production pipeline management system 108 to obtain data for presenting a user interface for managing parts production and delivery statuses and present the user interface to a supplier that supplies parts units to assemblers. In some embodiments, a supplier may be a manufacturer of a parts unit for an end article. For example, if the end article is a vehicle, the parts unit may include any applicable parts of the vehicle, such as a steering wheel, a windshield, a transmission, a battery, a seat, and so on. The structure of the supplier system 106 can be the same as or substantially similar to that of the assembler system 104. However, depending upon a specific implementation, the user interface provided to the supplier system 106 may be different from the user interface provided to the assembler system 104. Further, depending on the implementation, users of the assembler system 104 may have access to different privileges (or features) than users of the supplier system 106.

In the example of the system 100 shown in FIG. 1A, the production pipeline management system 108 represents hardware configured to generate a model of one or more production pipelines using a set of user-defined data objects relating to assemblies and production events linked to said assemblies. The production pipeline management system 108 may set up a GUI for managing, for example, parts production and delivery statuses (but not limited thereto) and enable the assembler system(s) 104 and the supplier system(s) 106 to present the GUI thereon. In some embodiments, the parts production and delivery statuses management system 108 provide programming instructions that cause the assembler system(s) 104 and/or the supplier system(s) 106 to generate respective GUIs for managing parts production and delivery statuses based on the programming instructions. In some embodiments, a GUI presented by the assembler system(s) 104 and/or the supplier system(s) 106 includes a status list indicating a respective production status, dispatching status, and/or delivery status corresponding to various parts units. Details of user interfaces presented by the assembler system(s) 104 and/or the supplier system(s) 106 are discussed below.

In the example of the system shown in FIG. 1A, the resource repository 110 represents a datastore configured to store management resources. In some embodiments, the management resources include datasets representing objects (assembly objects, production event objects and/or alert objects) selected and/or configured from the assembler system(s) 104 and/or the supplier system(s) 106, and datasets representing data and/or objects generated by the production pipeline management system 108. For example, datasets received from the assembler system(s) 104 may include datasets regarding details of an assembler such as identification, geographical location, contact information of the assembler, and details of an order of a parts unit such as identification, specification, requested delivery window or slot, a preferred delivery time, a delivery destination, identification of a supplier of the parts unit, and so on. For example, said received details may be in the form of a configured assembly object representing the parts unit, including the identification and specification, and one or more production event objects linked to the assembly object defining, for example, a requested delivery slot having start and end time values. For example, datasets received from the supplier system(s) 106 may include datasets regarding details of a supplier such as identification, geographical location, contact information of the supplier, and details of a parts unit supply such as identification, dispatched time (if any), production progress, forecasted delivery time, a delivery destination, identification of an assembler of the parts unit, and so on. For example, said received details may be in the form of a configured assembly object representing the parts unit, including the identification and one or more production event objects linked to the assembly object defining, for example, the type of production event, its start time, end time, duration, as well as properties associated with the or each production event.

The resource repository 110 may also receive datasets from the supplier system(s) 106 and/or assembler system(s) 104 representing alert objects, defining conditions or rules for determining when an alert is to be issued.

For example, datasets generated by the production pipeline management system 108 may include logs of updates of datasets based on datasets received from the assembler system(s) 104 and/or the supplier system(s) 106, default setting values, and so on. More specifically, the logs of updates may include logs of updates to a production event property, logs of updates to a dispatching status, logs of updates to a delivery status, logs of updates to a requested delivery window, and logs of updates to a preferred delivery time. For example, default setting values may include default values for any of the above examples.

The configuration data repository 114 is configured to store technical data relating to assemblies represented in the resource repository 110. For example, if a supplier using the supplier system 106 generates an assembly object for an engine part, then technical data may comprise one or more of its materials, components, dimensions, and other technical specification data.

In some embodiments, the resource repository 110 and configuration data repository 114 described herein may be configured in a combined or respective database. The databases may comprise one or more such databases that reside in one or more physical devices and in one or more physical locations. The database may store a plurality of types of data and/or files and associated data or file descriptions, administrative information, or any other data. In some embodiments, the database includes a referential table in which relationship among stored datasets are indicated separately from a status list. In a specific implementation, the referential table includes a plurality of entries, and each of the entries may correspond to a single parts unit, a single assembler, and/or a single supplier. Further, an entry of the referential table includes an identifier and metadata of datasets associated with the entry, and also include various relationships with other datasets. For example, in an entry, the various relationships includes identifiers of other datasets that matches a specific relationship type with respect to each of a plurality of relationship types. In some embodiments, the resource repository 110 may comprise a storage device including one or more of random access memory (RAM), read only memory (ROM), and/or other memory. The storage device may store the computer program instructions (e.g., the aforementioned source codes) to be executed by a processor as well as datasets that may be manipulated by the processor. The storage device may comprise floppy disks, hard disks, optical disks, tapes, or other storage media for storing computer-executable instructions and/or data.

FIG. 1B illustrates an example of data object types which may be stored in the resource repository 110. The data objects, as mentioned above, may comprise one or more facility objects 120, one or more assembly objects 122, one or production event objects 124, and one or more alert objects 126.

Figure 2:
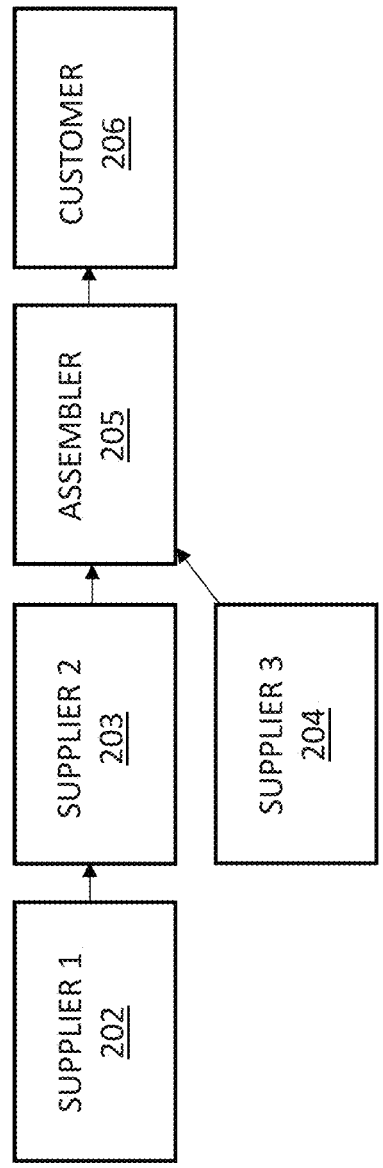
FIG. 2 illustrates an example production pipeline for an understanding of some embodiments.

FIG. 2 illustrates an example production pipeline 200 to show how various parties and therefore respective facilities may interact in order to provide an end-product to a customer 206. Each respective party or facility is represented as a separate box and those parties to the left hand side are chronologically earlier in the supply chain or pipeline than those towards the right hand side. Five parties are shown, but for the avoidance of doubt, a production pipeline may be formed of any arrangement of two or more such parties. For example, a first supplier 202 may provide one or more assemblies to a second supplier 203. The second supplier 203 may connect or otherwise modify the supplied assembly from the first supplier 202 to produce a modified, e.g. more complex assembly, which is then provided to an assembler party 205. The assembler party 205 may also receive an assembly from a third supplier 204 and may assemble all received assemblies to produce an end-product which is then provided to the customer 206. Ideally, the timing of production events and the handover of assemblies between parties should be coordinated so that deliveries are made at a mutually-agreed time. It will be appreciated that small deviations in the supply chain can have significant knock-on effects for the downstream parties, potentially affecting the ultimate delivery date to the customer 206. It is not only late deliveries that can be problematic, but also early completion dates and/or deliveries, because the completing or receiving party may not have physical capacity to store the completed or received assembly if they have not planned for it. Deviations in timing, in particular, may be referred to as slippage. The pipeline management system 108 shown in FIG. 1A is therefore configured to enable mutual coordination between two or more such parties in order to minimize slippage and/or to identify it at an early opportunity in order to make appropriate changes to their facilities and/or physical resources and/or to recover lost or gained time, for example by swapping or re-allocating assemblies. Methods and systems described herein help also to maintain trust between the various parties. For this purpose, each party involved in the production pipeline may access the pipeline management system 10 shown in FIG. 1A to be able to configure a respective part of a pipeline model, including properties, to update the pipeline model and to receive alerts as to deviations that may lead to slippage, among other things.

Figure 3:
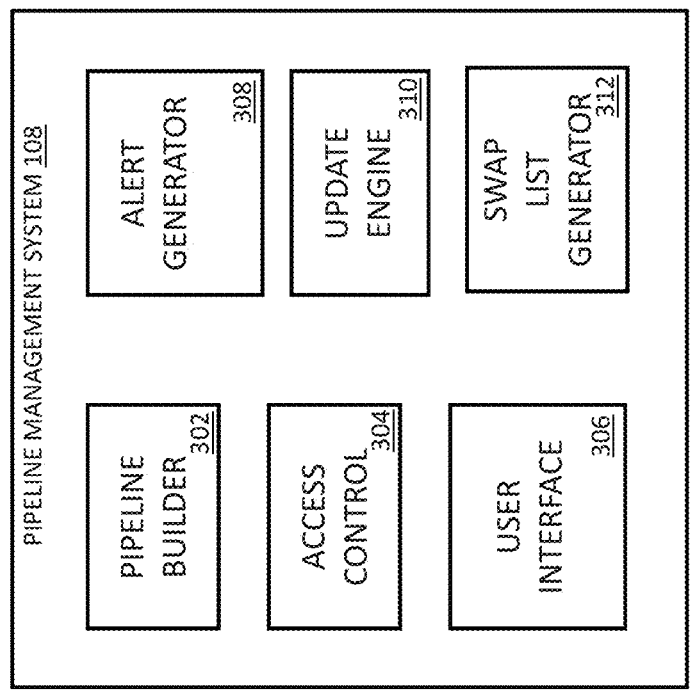
FIG. 3 illustrates in schematic view functional modules of a pipeline management system according to some embodiments.

FIG. 3 illustrates in schematic view functional modules of the pipeline management system 108. The pipeline management system 108 may comprise a pipeline builder 302, an access control system 304, a user interface (GUI) module 306, an alert generator 308, an update engine 310 and a swap list generator 312. Each functional module may be provided as a separate application or combined in a single application. Each of the two or more parties desiring to use the pipeline management system 108 may access each or a subset of the modules through a web-browser, or a dedicated plug-in that provides the relevant APIs for interacting with the modules. The pipeline builder 302 is a tool configured to enable users to model their respective part of the production pipeline, for example by configuring one or more facility objects 120, assembly objects 122, production event objects 124 and alert objects 126. The access control system 304 is configured to mediate access to the functional modules and to particular objects as configured, displayed and/or updated, including whether or not a particular party or user associated with that party is permitted to configure and/or modify data objects and/or provide input data indicative of changes to the properties of the data objects. The access control system 304 may be any conventional or tailored form of access control system which, for example, involve storing usernames and associated passwords for the various parties and their users, and thereafter determining what said permissions the parties and their users have. The user interface (GUI) module 306 is configured to generate one or more user interfaces for display to parties involved in a particular part of a production pipeline. At least part of the generated GUI may be common to the involved parties and may update in real-time or near real-time as modifications are made. The alert generator 308 is configured to identify when alert objects are enabled, i.e. when alert logic associated with an alert object is met. The alert generator 308 may run continuously or periodically, e.g. whenever update input is received. The swap list generator 312 is configured to manage the re-allocation of assemblies in the event of conflicts, as will be explained later on.

Figure 4:
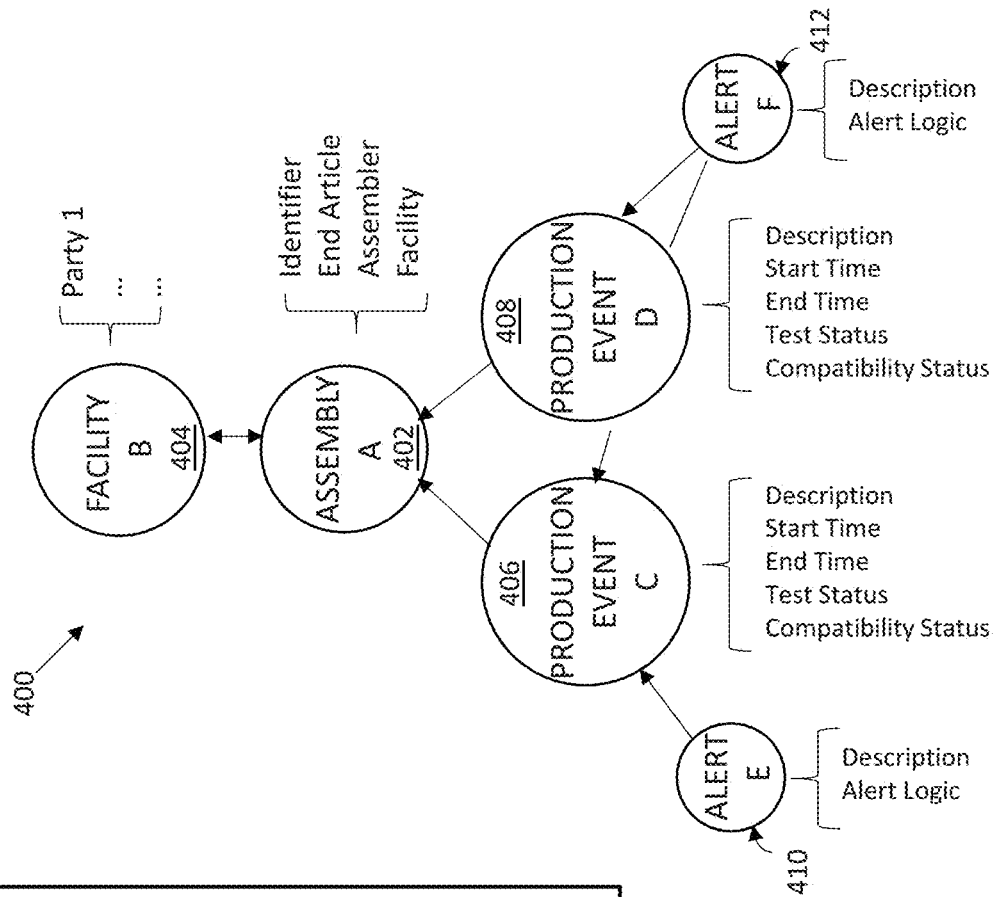
FIG. 4 illustrates in schematic form a typical model representing part of a production pipeline from the perspective of one party, e.g. a supplier, according to some embodiments.

FIG. 4 illustrates in schematic form a typical model representing part of a production pipeline 400 from the perspective of one party, e.g. a supplier. The party may, for example, configure an assembly object A 402, linked to a facility object B 404, and one or more production events C and D 406, 408 linked to assembly object A and therefore to facility object B. Each object may have associated properties, which may be user-configured. For example, the assembly object A 402 may include data representing an identifier, an end article, the assembly it is to be connected or fitted to, and the facility it is being handled. For example, the facility object B 404 may indicate which party it is associated with, their location, address, and so on. For example, each production event object C, D 406, 408 may comprise a description, a start time, an end time, and optionally a default duration, a test status and a compatibility status. Further, one or more alert objects E, F 410, 412 may be associated with the assembly object A 402, and may depend in some way on the properties of one or more of the production events 406, 408. Each alert object E, F 410, 412 may comprise properties including a description and alert logic. An example of alert logic may comprise "generate alert if the end time of production event C goes beyond start time of production event D" or "generate alert if the end time of production event D is later than start time of production event E". Alert logic can relate to any detectable timing or status, e.g. "generate alert if a test status indicates failure" or "generate alert if a compatibility status indicates false." Parties may also configure the alert style or message that will be produced.

In this respect, a test status may refer to whether or not an assembly passes or fails an inspection or test, such as a functional or quality control test at the facility concerned. A failure may mean that additional time is required to fix the problem. The output of the quality control test may be received in data form, e.g. a data message, from test equipment. At the test equipment, the relevant assembly may be identified beforehand using manual input, or by scanning a code, e.g. barcode, QR code or RFID code, on or associated with the assembly, following which the test is run and the result sent to the pipeline management system 108 which updates the test status property with at least "pass" or "fail" or similar.

A compatibility status may refer to the compatibility between two assemblies, whereby another party provides a requirement specification in data form that may, for example, be stored in the configuration data repository 114. Referring back to FIG. 2, for example, if the third supplier 204 is to provide an assembly X that is to be connected by the assembler 205 to a different assembly Y, to be provided by the second supplier 203, and, for some reason (e.g. a mistake or specification shift) the specification of assembly X changes, then the updated specification stored for the corresponding assembly object in the configuration data repository 114 will reflect that change. An alert set-up for any or all of the second and third suppliers 203, 204 and the assembler 205 may comprise logic that checks compatibility in the event of any update to the configuration data repository 114 in terms of related assemblies. By virtue of assemblies X and Y relating to the same end assembly, mentioned in the end article property for both assemblies, it can be checked whether the change to assembly X makes it incompatible with assembly Y. For example, assembly X may need to be connected to part of assembly Y based on a dimensional or electrical requirement, e.g. in terms of an absolute value, minimum or maximum value or range of values. For example, if assembly X is changed to run from a 12 v supply to a 24 v supply, then assembly Y, running on a 12 v supply becomes incompatible and this needs to be alerted to one or more of the involved parties. For example, the compatibility status of the production event for the second supplier 203 of assembly Y may switch to false, which triggers the alert according to the logic "if compatibility status=false, then alert incompatibility" or similar.

In some embodiments, there may be a predetermined time shift associated with such a failure or false determination in relation to the test and/or compatibility statuses, which indicates a default additional time that needs to be added to the relevant end time to deal with such an issue. Such default times may be pre-defined and may be modified if needed. The default additional time may be proposed or enacted automatically to change the relevant end-time, and other start and end times of downstream production events, which itself may generate new alerts. In general, the pipeline management system may store default time shifts or offsets that can be applied automatically, in either direction 108, based on updated received via inputs. Said time shifts can be applied to all dependent events.

Example Scenarios

Figures 5A, 5B, 5C:
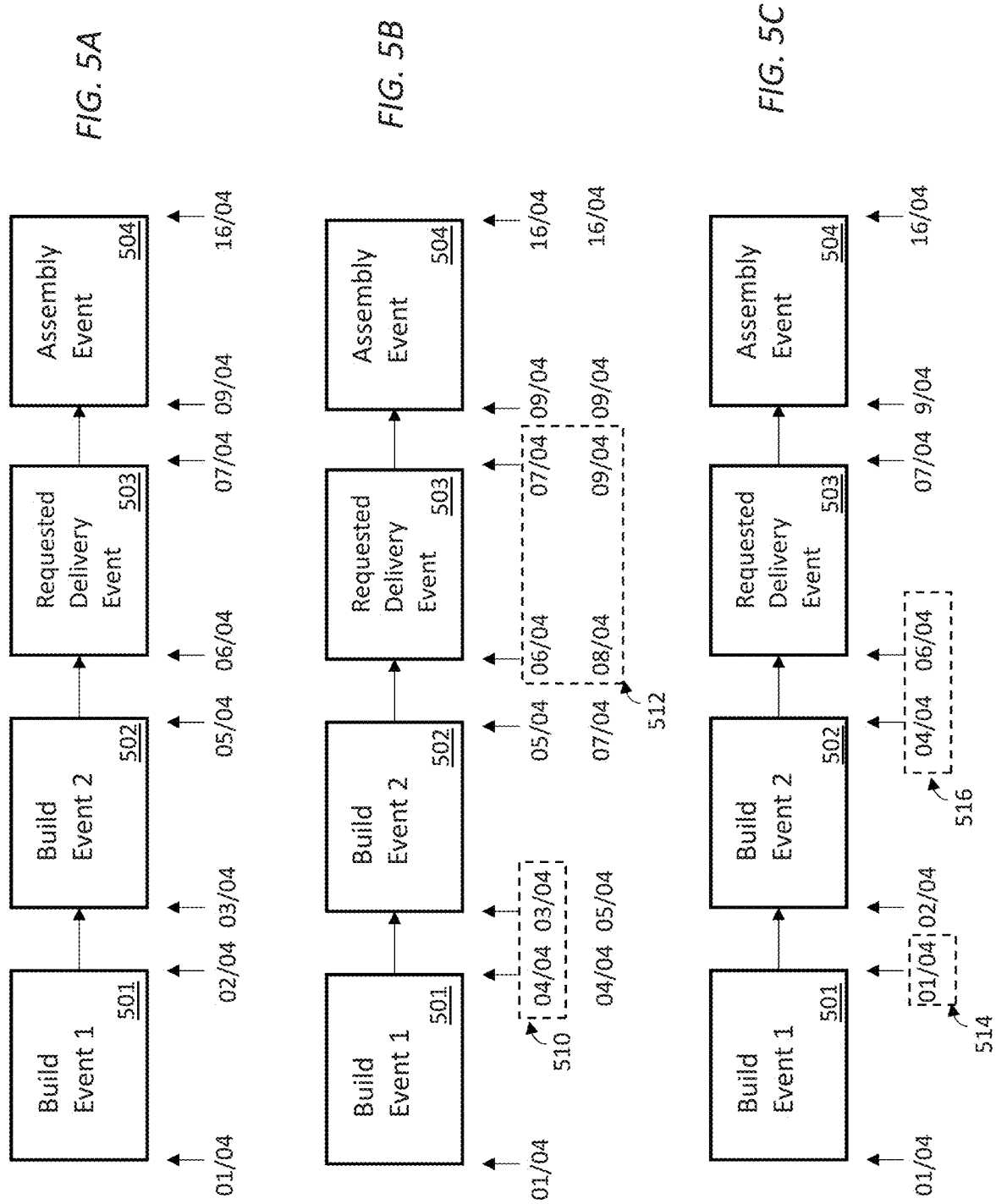
FIGS. 5A-5C show example production pipeline scenarios which are useful for understanding example embodiments.

FIGS. 5A-5C show example production pipeline scenarios which are useful for understanding example embodiments.

FIG. 5A shows a plurality of production events in relation to a particular assembly, each of the production events and the assembly being represented using the respective objects mentioned previously. The production pipeline comprises a first build event 501, a second build event 502 that follows the first build event, a requested delivery event 503 and an assembly event 504. The first and second build events 501, 502 may be configured by a first, supplier party. The requested delivery event 503 and the assembly event 504 may be configured by a second, assembling party. Each production event 501-504 has an associated start and end time property and is assumed that the shown order and set of times has been agreed upon by both parties. It will be seen from the dates that there is a non-overlapping chronology in terms of timings.

Referring now to FIG. 5B, an input may be received from the supplier party which changes the end time of the first build event 501. This may be due to one or a plurality of reasons. As indicated above, it may be due to a test failure, a compatibility failure (in which case the input may be automated to some extent) or some other reason such as personnel being off sick or tied-up with another project (in which case the input may be manual, e.g. through alphanumeric entry and/or using a calendar tool). In this case, the modification results in the end time of the first build event 501 moving forwards two days, therefore being after the start time of the second build event, as indicated within box 510. If an alert object has been set-up to detect such a condition, an alert may be issued to the GUI, as mentioned later on. The dates in the line below indicates the potential knock-on effects of the represented two-day delay, or slippage. As indicated within box 512, modelling the propagation of a two-day delay onwards will mean that the requested delivery date will be after that initially specified by the assembling party. If an alert object has been set-up (e.g. by the assembling party) to detect such a condition, an alert will be displayed to one or both parties via the GUI. However, it can also be seen by all parties that this knock-on effect will not necessarily affect the assembly event as the end time of the requested delivery event 503 will be the start time of the assembly event 504. Although not ideal, it may be acceptable. Therefore, a proposal for a modified set of event properties may be proposed by the supplier party (or, in theory the assembling party) which may need to be confirmed by both parties to take effect. An alternative is for the supplying party to re-allocate the assembly concerned using a swap list, to be explained later on. Either way, both parties can see issues as and when they arise, and co-ordinate how to handle them. For example, physical resources allocated to receive the delivery between the requested delivery slot times that are no-longer applicable can be de-allocated and re-allocated at the new, later time, thereby freeing up those resources for other assemblies. As mentioned, this can be handled automatically by sending a message to an allocation/de-allocation computing system at the assembling party's facility.

Referring now to FIG. 5C, an input may be received from the supplier party which similarly changes the end time of the first build event 501, but, in this case, the change reflects an earlier-than-expected end time, as indicated in box 514. This may or may not generate an alert, displayed to one or both parties, depending on whether an alert object is set-up to detect such a condition. The supplier party may model, or it may be modelled automatically responsive to the input, what the knock-on effect is to the later dates at least associated with the supplier party. In the shown example, the start date has been set one-day earlier, as has the end date, which is based on a duration property associated with the build event being two days. This means that there is a time gap of, in this case, two days between when the assembly is ready for delivery and when the assembling party has requested delivery. This intervening time period may, incidentally, be modelled using a separate forecasted delivery event object. This intervening period may or may not be problematic for the supplier party, depending on whether they have physical resources, e.g. space, to store the completed assembly. An alert object may be set-up, for example to detect a condition as indicated in box 516 where there is greater than a one-day period (or other period) between completion of the final build event and the requested delivery event, and both parties may be alerted to such a condition using the GUI. The supplier party may then negotiate with the assembling party to obtain an earlier requested delivery event start time or simply tolerate having to store it. An alternative is for the supplying party to re-allocate the assembly concerned using a swap list, to be explained later on. As before, both parties can see issues as and when they arise, and co-ordinate how to handle them. For example, physical resources allocated to receive the delivery between the requested delivery slot times that are no-longer applicable can be de-allocated and re-allocated at the new, earlier time, thereby freeing up those resources for other assemblies. As mentioned, this can be handled automatically by sending a message to an allocation/de-allocation computing system at the assembling party's facility.

Following-on from the above example, in some example embodiments some production events may overlap by design, e.g. if an assembly event lasts for a predetermined time period of, say, two weeks, and other production events may occur within that time period. Alert objects based on the overlap would not be set-up in such a situation.

Example User Interfaces (GUIs)

FIGS. 6A-6E show example partial GUIs that may be displayed responsive to one or more of the situations mentioned above with regard to FIGS. 5A-5C. The GUIs are partial in that only some GUI functionality may be shown and it should be appreciated that other displayable elements and user-selectable control elements may be present in such GUIs, for example to permit editing, filtering, updating, loading and saving, as may be typical for such GUIs. The GUIs may be generated by the user interface (GUI) module 306 shown in FIG. 3 for managing production pipelines and for monitoring statuses of production events. In other embodiments, the GUIs may be generated and/or presented by an applicable system such as the assembler system(s) 104 and the supplier system(s) 106 in FIG. 1A, through applicable programs, such as a web browser and/or a dedicated application program for presenting the GUI.

FIG. 6A shows part of a GUI 600 which comprises in tabular form a series of rows and columns, wherein each row comprises an entry representing a particular assembly object and each column represents a data field, to be explained here. The GUI 600 may have two main sections: an identifier section 620 and a status section 630. The GUI 600 effectively provides a status list in status section 630 for identifiable assemblies. The status list in section 630 is intended to serve as a primary region of the GUI 200 for managing the production pipeline and can be manipulated based on user operations, including scrolling, object selection, tab expansion, text inputs, and so on.

The first four columns 601-604 comprising the identifier section 620 are used to represent identifier properties of the assembly object in a given entry 614. In the shown example, the identifier section 620 includes an end article identifier 601, a group identifier 602, a group part identifier 603, and a production line identifier 604. The end article identifier 601 indicates identification of an end article for which the corresponding assembly is used. For example, the end article identifier 601 may identify a model and a specific vehicle identification number (e.g., VIN) of a vehicle, when the end article is a vehicle. The group identifier 602 indicates identification of a section of the end article in which the corresponding assembly is used. For example, the group identifier 602 may identify a section of a vehicle (e.g., driver instrument panel section), when the end article is a vehicle. The group part identifier 603 indicates identification of the corresponding assembly. For example, the group part identifier 603 may specify a type of a display monitor, when the corresponding assembly is the display monitor. The production line identifier 604 indicates identification of a production line at which the corresponding assembly is used for assembling. For example, the production line identifier 604 may identify a geographical region of a factory, a factory, and/or a production line in a factory. Depending on a specific implementation, the display order of the end article identifier 601, the group identifier 602, the group part identifier 603, and the production line identifier 604 may or may not be rearranged by users. Also, entries in the status list may or may not be sorted based on one or more of the display order of the end article identifier 601, the group identifier 602, the group part identifier 603, and the production line identifier 604.

In each entry, e.g. entry 614, the status section 630 represents a section to indicate production events of a corresponding assembly. In the shown example, the status section 630 includes one or more blocks 606-612, each of which may represent a production event for example, using a separate block for the start time and the end time. The first entry 614 in FIG. 6A corresponds to the data objects and property values represented in FIG. 5A, and hence it will be seen that values under blocks 606 represent properties of the first build event object 501, values under blocks 608 represent properties of the second build event object 502, values under blocks 610 represent properties of the delivery event object 503 and values under blocks 612 represent properties of the assembly event object 504. Other entries corresponding to other assembly objects are not shown.

FIG. 6B shows the GUI 600 when first input data is received. The first input data, as mentioned, can be received via a number of mechanisms, e.g. user input via the GUI 600 or input from a computer system or application, but here it is assumed that the change to the end time of the first build event 501, shown in FIG. 5B, is received via the GUI, which may be by means of the supplier party right-clicking over the block 640 and selecting a new time via a calendar interface (not shown). The time is changed from 02/04 to 04/04. Assuming an alert object has been set-up corresponding to "issue alert if build end time is later than subsequent build start time" or similar, then an alert may be issued to the GUI 600. The alert may be a visual alert with emphasis on the one or more blocks affected, and in this case comprises a circle indication 618 within the affected block 640. As an alternative, the entire block 640 may be emphasized in some way. Hovering a mouse pointer or cursor over the alert indication 618 may bring up a narrative 650 giving more detail on the nature of the alert, in this case that the milestone is late. The indication 618 may be in any suitable form, e.g. any shape and may be colored or shaded to indicate other information, e.g. as to priority. For example, a first color or shade may be used to indicate a low priority alert and a second color or shade to indicate a high priority alert. The alert levels may be based on factors such as how much deviation or slippage there is in relation to the rule, how long the alert has been active, or other parameters. Selecting the indication 618 and/or narrative 650 may cause presentation of a further information window and/or a graphical means of effecting modifications.

For example, the supplier party may request that subsequent production event objects under their control be propagated onwards due to the slippage, as modelled in FIG. 6C. It will be seen that the second build start and end times have been moved back by the corresponding number of days. This updated form of GUI 600 may be used to indicate a proposal to the assembling party. Responsive to this, FIG. 6C shows that an alert indication 652 is issued as a result of the proposal because of an alert object set-up by the assembling party to identify a delivery start time before the second build end time. Hovering a mouse pointer or cursor over the alert indication 652 may bring up a narrative 655 giving more detail on the nature of the alert, in this case that the earlier milestone is late. The assembling party may reject or confirm the proposal. FIG. 6D shows the GUI 600 after the assembling party confirms the proposal, whereby the blocks generally indicated 660 are moved back by the corresponding time automatically, although the assembling party may modify one or more of the block entries manually based on their own requirements and, similarly, a proposal made via the GUI 600 may be given to the supplier party for rejecting or confirming.

FIG. 6E shows the GUI 600 providing another alert in a different situation starting from the FIG. 6A position. Here, the second build end time, indicated within block 662, has completed earlier than planned. Having been updated by the supplier party as input, an alert may be issued using an alert indicator 664 within the relevant block to indicate a "too early" alert. That is, a corresponding alert object may be set-up to "alert if build end time is more than two days before delivery start time" or similar. As mentioned, this may have the knock-on effect of requiring storage of the assembly when limited space is available. The alert indicator 664, which can be expanded as before to show a narrative 668, serves to alert one or both parties that a modification, e.g. the assembling party accepting an earlier delivery, may be mutually beneficial, or that storage space at the supplier party needs to be allocated. Negotiation can happen via the GUI 600 as mentioned before. This form of alert may be shown in a suitable color or shade to indicate a lower priority than a "too late" alert of the type mentioned above.

Figure 7:
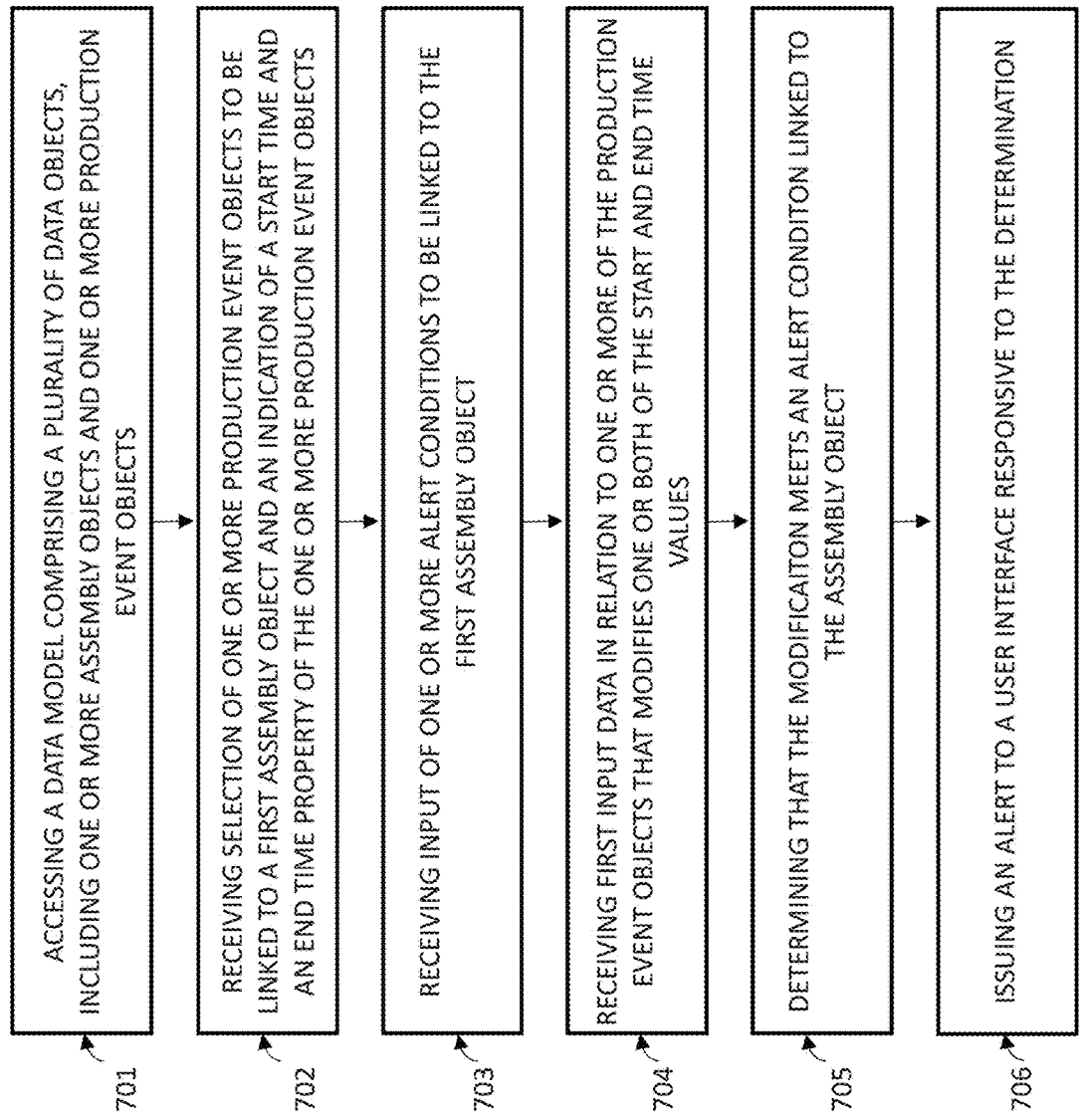
FIG. 7 is a flow diagram showing operations that may be performed in accordance with some embodiments.

FIG. 7 is a flow diagram showing operations that may be performed in accordance with one or more example embodiments. For example, the operations may be performed by hardware, software, firmware or a combination thereof. For example, the operation may be performed by the pipeline management system 108 shown in FIG. 1A.

A first operation 701 may comprise accessing a data model which comprises a plurality of data objects, including one or more assembly objects and one or more production event objects. For example, each assembly object may represent a part to undergo one or more production events to be performed on a part at a first party facility for providing to a second party facility. For example, each production event object may represent a particular production event and having a plurality of properties, including an associated start time property and an end time property.

A second operation 702 may comprise receiving selection of one or more production event objects to be linked to a first assembly object and an indication of values for at least the start time property and end time property of the one or more production event objects.

A third operation 703 may comprise receiving input of one or more alert conditions to be linked to the first assembly object. The alert conditions may be provided in the form of alert objects.

A fourth operation 704 may comprise receiving first input data in relation to one or more of the production event objects that modifies one or both of the start and end time values;

A fifth operation 705 may comprise determining that the modification meets an alert condition linked to the assembly object.

A sixth operation 706 may comprise issuing an alert to a user interface responsive to the determination.

Figure 8:
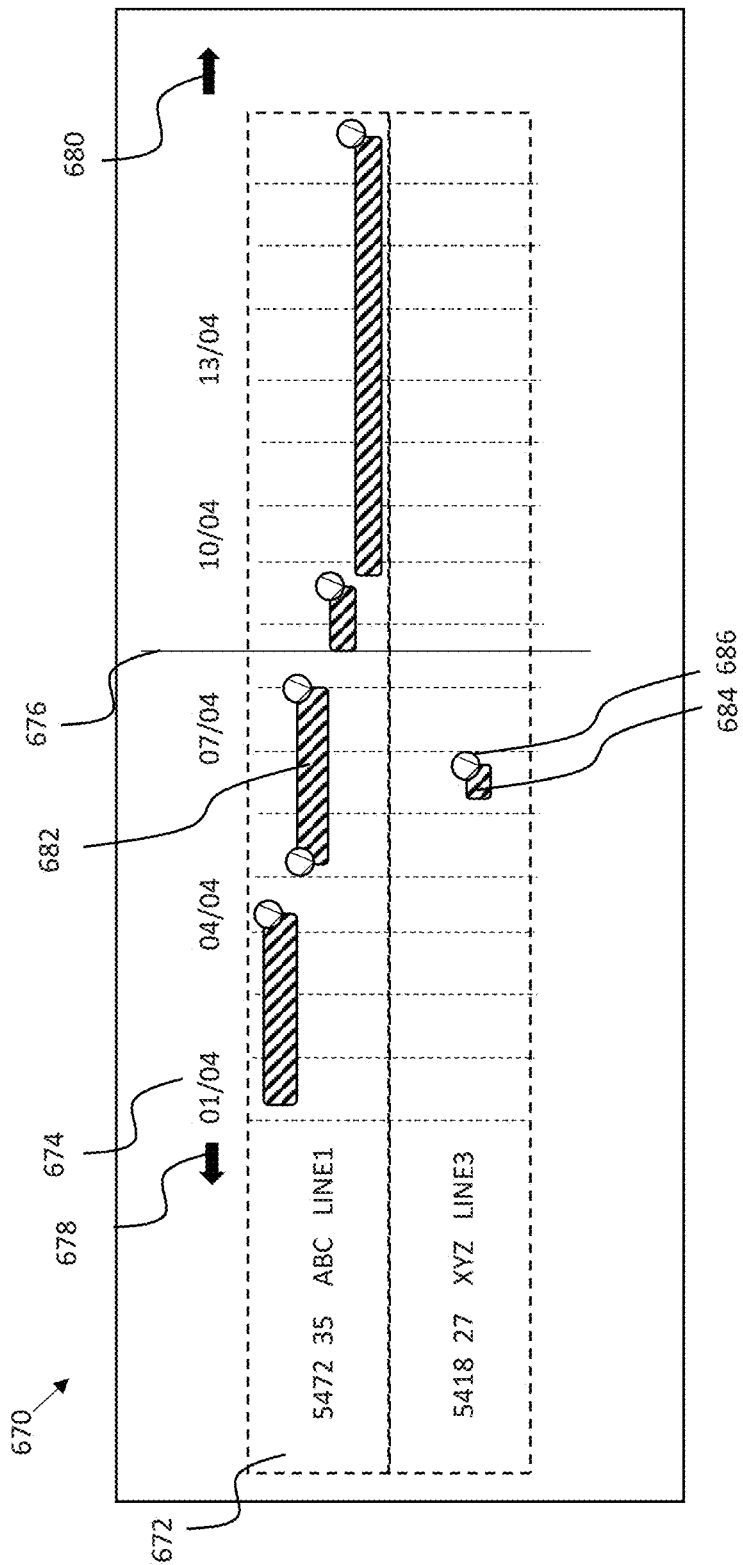
FIG. 8 shows an example partial GUI, being a timeline view, according to some embodiments.

Optional operations may include causing the user interface to be displayed on first and second computing systems, respectively associated with the first party and the second party, the user interface including a status list including one or more entries, wherein each entry corresponds to an assembly object, including a first entry associated with the first assembly object and, associated with the first assembly object, an indication of the one or more production event objects linked to the first assembly object, including their start and end time values. The production event objects may shown in chronological order. The FIG. 6A-6E examples comprise a condensed table view GUI 600, but users may toggle between this GUI format and a timeline GUI format where production events span along a timeline, as shown in FIG. 8, for example. Selection of the one or more production events, including the indication of start time and end time values, and the input of alert conditions, may be receivable from both of the first and second computing systems whilst being restricted to production event objects performed at their own respective facilities. In some embodiments, the first assembly object is linked to first and second sequential production event objects in which the start time value of the second production event object is dependent on the end time value of the first production event object, and the second production event has a predetermined duration. In some embodiments, responsive to the received first input data modifying the end time value of the first production event, the start and end time values of the second production event are modified forwards or backwards in time by the predetermined duration and indicated on the user interface.

In some embodiments, one of the production event objects linked to the first assembly object is a forecasted delivery time for an assembly object, having start and end times dependent on an end time of one or more preceding production event objects, and another of the production event objects is a requested delivery time slot, received from the second party for the first assembly object. An alert condition may be such as to cause an alert to be issued if the forecasted delivery time is modified by the first input data so as to be outside of the requested delivery time slot. There may be received second input data from the second party which modifies the requested delivery time slot such that the current forecasted delivery time for the assembly object moves from inside to outside of the modified requested delivery time slot, and responsive thereto, causes an alert to be issued to the user interface. The requested delivery slot object may comprise a start time and an end time, and the predefined alert condition is such as cause an early alert to be issued if the forecasted delivery time is before the requested delivery slot start time and a late alert if after the requested delivery slot end time. The first input data may be received from a computing system associated with the first party and may correspond to an updated status property of one of the production event objects, e.g. the indicative of the assembly failing a functional or quality control test (which may be received automatically from a computerized testing apparatus or system, or may be received via manual input). Alternatively, or additionally, the updated status property may be indicative of the assembly not matching a requirement specification for the assembly provided by the second party. The updated status property may have a corresponding delay time associated with said status property, which delay time is used to determine the modified end time for the production event object.

In some example embodiments, users may toggle between the above-described table view and a timeline view 670, as depicted in FIG. 8. The timeline view 670 functions similar to the table view in terms of its interaction with other elements of the pipeline management system 108. The timeline view 670 shows, effectively, part of a calendar grid along the horizontal axis with the vertical axis including assembly identifiers 672 relevant to the particular set of dates currently in view. Dates 674 are shown in respect of a selected range and the timeline view 670 can be moved backwards and forwards in time by means of selection of respective arrows 678, 680 or similar. The current date is indicated by vertical line 676 or similar. By definition, because the timeline view 670 is zoomed or restricted to a specific subset of time, selection of said specific subset will automatically filter down to show assemblies with events within that range. Assemblies with no events within the selected range will not appear.

The timeline view is configured to show production events as ranges; if a production event has a start time and end time, the production event is shown as a duration, e.g. see item 682. In some cases, a user may wish to add a milestone to act as a "nugget", e.g. as a single milestone 684. Whether or not a production event is confirmed or not may be indicated graphically, in this case by means of a checkmark 686. As in the case of the production event 682, both start and end times can be shown as confirmed by the use of two checkmarks. Production events that are tied to an alert in the timeline view 670 may be shown in a particular colour or shade. Even if a production event is in the past, an alert tied to that production event remains shown as such; this is a way to indicate that such production events were involved in an alert as this may affect the production status of forthcoming events. As we can see here, even if an event is in the past, the alert colour take precedence as it's a way to indicate that this event actually were involved in an alert (as this might affect the production status of coming events). Events that are in the past may otherwise be coloured with a different colour or have a different appearance than those in the future or which are not-completed.

Swaps and Swap Lists

As mentioned and exemplified above, where one or more alerts corresponding to alert objects are issued or enabled, sometimes the cause of the alert can be mitigated or removed by re-scheduling. However, this may involve complex rounds of negotiation between multiple parties, time delays and ultimately there may be knock-on effects that cannot be avoided and will ultimately delay some aspect of the production pipeline.

Another option is for one of the parties to re-allocate, or "swap" one assembly object with another, usually using one or more assembly objects within their facility or control. For example, if a production event end time for an assembly X will be later than a requested delivery time of the assembling party, then it might be replaced by the supplier party with another assembly Y under their control if that assembly is functionally-equivalent to assembly X and is, or can be, completed before the requested delivery time. How to perform this efficiently, safely and model the downstream effects of the swap is something that can be managed by the pipeline management system 108 according to example embodiments.

Referring back to FIG. 3, the swap list generator 312 is a software module that can be invoked by the pipeline management system 108 at any time, for example via the GUI 600 or through some other means. For example, in the event of a so-called non-compliance event, which is a broad term covering any enabled alert condition relating to a production event, although, in some embodiments, may be restricted to alert conditions relating to start/end time conflicts, e.g. too late or too early, as mentioned above, the GUI may open or enable the user to open a so-called swap-builder which is linked to the swap list generator 312. The swap builder may be a GUI sub-window or a new window overlying the GUI 600 which allows the user either to select a first assembly object which is under their control, or automatically selects a first assembly object which is already highlighted or for which an alert has been issued. The swap builder may then identify other assemblies under the party's control which are functionally equivalent.

The swap list generator 312 software module may operate without invocation via the GUI 600. For example, the swap list generator 312 may execute in the background. For example, the swap list generator 312 may pre-compute a list of functionally equivalent (compatible) assemblies before the GUI 600 is opened and/or a user selects to open the swap builder via the GUI. The user then only selects those first assembly objects of interest. The user does not have to review all other assembly objects and can view those precomputed ones that are already swappable.

A functionally equivalent assembly is an assembly that is either the same in terms of function, substantially the same, or which can be modified to be the same within a predetermined time frame, to perform the same function. For this purpose, there may be stored a set of mappings in the configuration data repository 114 (see FIG. 1A) which indicates equivalency mappings between different assemblies, possibly with indications as to whether they are the same, similar or modifiable and, in the case of the latter, details of the modifications that would be needed to make the particular assembly equivalent. The mappings may be represented as mapping data in a spreadsheet or other data representation. The mappings may be generated and possibly periodically checked by one or more particular individuals or organizations to ensure that the data is accurate, e.g. to certify the equivalencies. By storing the mappings as a data model in the centralized configuration data repository, multiple parties may make use of (i.e. read) said mapping data and it can be centrally certified and updated as and when by a restricted number of technically-qualified users.

Identifying functionally equivalent other assemblies may involve emphasizing or highlighting them on the GUI 600. Where there are two or more equivalent other assemblies, the relevant party may select one of them. This may generate an updated GUI showing the selected other assembly in place of the first assembly, including any modified downstream effects via the updated GUI, possibly including alerts triggered by existing alert objects. This updated GUI provides a swap proposal, in the sense that the existing GUI 600, and its underlying model which reflects the current state is not itself updated at this time. The relevant party may, for example, want to try alternative swaps and visualize their effects before committing to a swap at which time the existing GUI 600 and underlying model is updated. Also, confirmation from other involved parties may be needed before a swap can be committed. The swap proposal may visually look the same or similar to the existing GUI 600 but is stored as a separate data entity and may enable roll-backs or "undos" or may store other swap proposal data entities for each different proposal.

Furthermore, the swap list generator 312 may automatically filter the functionally-equivalent other assemblies to show only those that will not trigger the same or even downstream alerts if swapped. This may involve some pre-modelling, involving modelling automatically the downstream effects of the limited number of equivalent assemblies and possibly providing a recommendation of one or more most-appropriate swap candidates.

Figure 9:
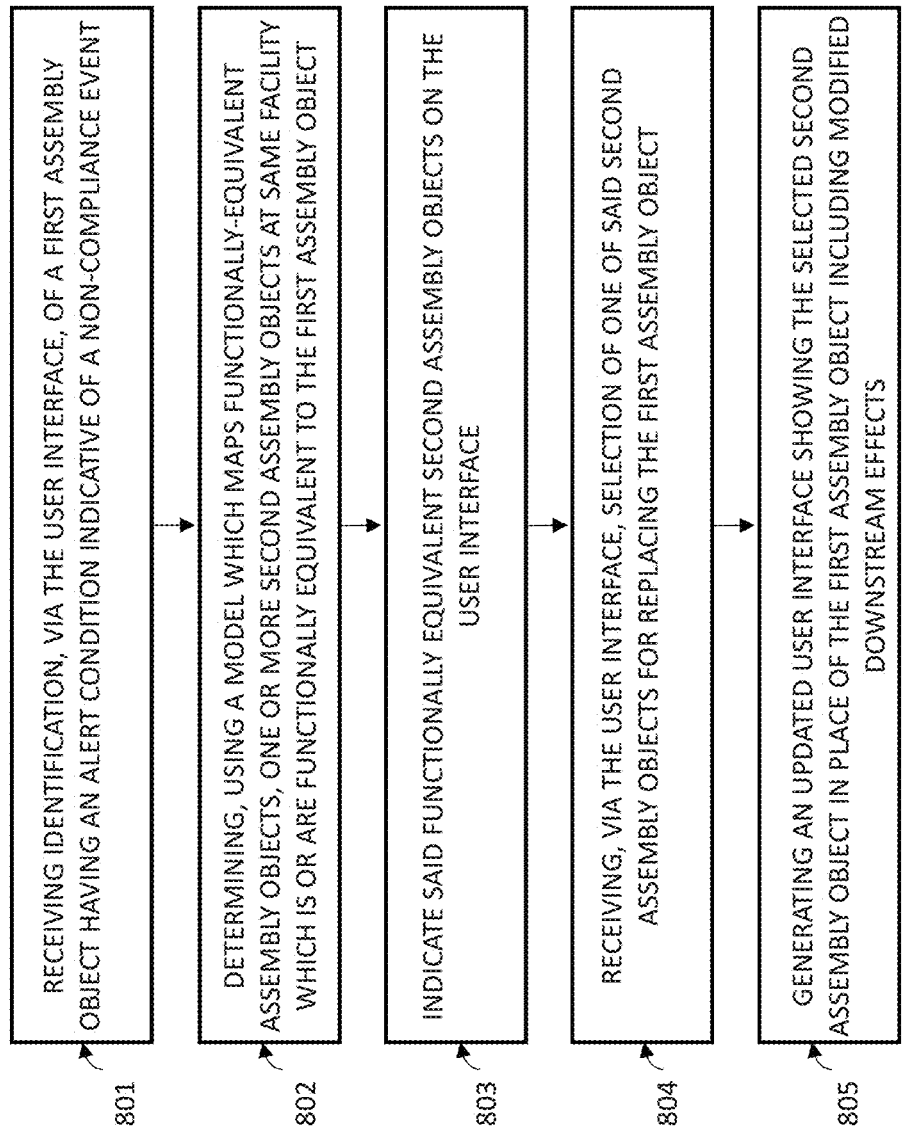
FIG. 9 is a flow diagram showing operations that may be performed in accordance with some embodiments.

FIG. 9 is a flow diagram showing operations that may be performed in accordance with one or more example embodiments. For example, the operations may be performed by hardware, software, firmware or a combination thereof. For example, the operation may be performed by the pipeline management system 108 shown in FIG. 1A, for example using the swap list generator 312. The operations in FIG. 9 may be performed in conjunction with those of FIG. 7, for example, responsive to an alert condition that relates to a non-compliance in terms of timings.

A first operation 801 may comprise receiving identification via a user interface of an assembly object A having an alert indicative of a non-compliance event.

A second operation 802 may comprise determining, using a second object model which maps assembly objects to one or more functionally-equivalent assembly objects, one or more second assembly objects B currently at the first party facility which is or are functionally-equivalent to the first assembly object;

A third operation 803 may comprise indicating said functionally-equivalent assembly objects on the user interface.

A fourth operation 804 may comprise receiving, via the user interface, selection of one of said second assembly objects B for replacing assembly object A.

A fifth operation 805 may comprise generating an updated user interface showing the selected, second assembly object B in place of the assembly object A, including modified downstream effects, e.g. to one or more other assembly objects and/or production event objects which are dependent on assembly object A, due to the replacement.

In some cases, assembly object A may replace the second assembly object B, e.g. a direct swap.

In some cases, a direct swap may not be appropriate, e.g. because A causes a conflict when swapped with B. Therefore, in some embodiments, responsive to the selection, a swap list interface may be generated for creation of a closed-loop set of replacements involving three or more functionally-equivalent assembly objects. In this case, the method may further comprise receiving selection of another one of said second assembly objects B' to replace assembly object B, and so on until assembly object A is used to replace a replaced assembly object.

FIGS. 10A and 10B indicate a swap proposal GUI 900 indicating a closed-loop swap scenario involving three functionally-equivalent assembly objects, which are highlighted within boxes 902, 904 and 906. Initially, an alert corresponding to a timing non-compliance issued for a first assembly 902. Particularly, the second build end time is after the delivery event start time. As such, the supplier party may open the swap builder via the current GUI 600 and sees the swap proposal GUI 900. The swap proposal GUI 900 may indicate functionally-equivalent other assemblies 904, 906, generated by the swap list generator 312 using the above-mentioned mapping data. Both other assemblies 904, 906 are suitable for swapping because their second build end times are prior to the delivery event start time of 06/04. The relevant party may select the first other assembly 904 for performance of the swap; this may be for various reasons. However, a direct swap is not optimal, and may result in an alert, because the first assembly 902 has a build end time that is the same as the delivery start time for the first other assembly 904. Therefore, the relevant party may select the second other assembly 906 to replace the first other assembly 904 and the first assembly 902 can replace the second other assembly 906 to close the loop without causing downstream alerts. This is shown in FIG. 10B which is the resulting swap proposal GUI 900. Note that the above process can also be performed automatically by the swap list generator 312 by modelling downstream effects for all equivalent other assemblies 906 using different swap permutations, whereafter one or more proposals can be presented. Once confirmed by all parties, the proposed swap model can be substituted for the existing model and shown on the existing GUI 600. As mentioned, roll-backs and undos are available prior to confirmation and substitution.

History/Logs

Referring now to FIG. 11 a user interface 1000 is shown for presenting logs of updates, as generated in accordance with a log request. In some embodiments, the log request is generated by applicable systems such as the assembler system(s) 104 and the supplier system(s) 106 in FIG. 1A, such that the user interface 1000 including logs of updates is presented. In some embodiments, the logs of updates includes update events (from any number of the parties) that have occurred with respect to a specific entry corresponding to a specific assembly object in chronological order. In some embodiments, the logs of updates can selectively include a narrative of the changed property, whether a time, status or indeed any parameter or property. As shown in FIG. 11, the user interface 1000 may comprise a header 1010 which indicated the identity of the assembly to which the logs relate. The user interface 1000 may also show in another portion 1015 which indicates the chronology of log events, either in textual or graphical form. The shown example uses a graphical timeline wherein elements 1020 represent modification events, elements 1025 represent the time the update was made, and elements 1030 provide a description or narrative of the update and which party requested or made it. The relative positioning of the elements 1020 may be indicative of which party requested or made the update as an alternative, or in addition to, a textual description. The log data may be immutable. The log data and the user interface 1000 therefore provides a way to verify and visualize which party is responsible for a historical update, aiding transparency and tracking.

Furthermore, in some embodiments, the log data may be utilized to learn, e.g. using a machine learning model, the cause and effect of updates, in order to provide subsequent inferences, e.g. for determining how to update production events in the event of received input, based on what has occurred in the past. For example, if a particular event caused a long delay that involved significant knock-on effects, and another, similar event was resolved in an alternative way, cost-measures associated with each resolution may be learned by the machine learning model to determine which approach to take for new, similar events.

Example embodiments describe apparatuses, methods, systems and computer-readable media storing computer-readable code for management of production pipelines, which may be involve providing real or near real-time time co-ordination of supply and demand milestones. Example embodiments may provide a user interface which lets suppliers and customers collaborate in a secure, transparent and safe computerized environment. A customer may in some situations be a supplier to another customer, for example a first supplier may supply a second supplier and the second supplier supplies an assembler. Both or all sides may see substantially the same view as regards the assemblies they collaborate on, to be able to track the progress of the assemblies through the production chain. For example, taking the example of first supplier and first assembler parties, said parties may agree on certain milestones for certain events, i.e. delivery dates, for certain tasks to be completed, e.g. build starts, build ends, delivery dates, installation starts, installation ends and so on. These milestones may be subject to slippage, e.g. delay or ready too-early, which can cause knock-on effects. Example embodiments can alert as to slippages, e.g. late deliveries and/or cross-dependent events where the date of one event feeding another is too close in time or too far apart. The tool can also alert to specification issues, e.g. a part not conforming to the requirements of a receiving party.

Example embodiments may also provide swap functionality. That is, where an assembly is due to miss a milestone, or due to some other non-compliance alert event, a supplier can identify possible replacement assemblies. The replacement may be identical or may be similar but within certifiable bounds. A predefined model or models comprising objects representing the technical configuration or specification of a given assembly may comprise mappings to equivalent, or equivalent-if-modified assemblies, using any suitable format. A mapping between assemblies indicates a predefined high likelihood that a selected assembly can be swapped with one of the mapped assemblies. A typical scenario is where supplier A identifies that an assembly for assembler or facility B (e.g. for wing part) will miss a delivery milestone but that there is an identical assembly ahead of schedule for assembler or facility C, meaning that the assemblies can be swapped so that both milestones can be met. A swap sheet can be built-up of swap proposals and the net effect of those proposals due to knock-on effects of making the swap. A swap sheet typically needs to be approved before it is put into effect, so that issues caused by a proposed swap can be taken into account. A reallocation chain can be built so that a loop of part swaps can be closed. Once approved, the swaps on the swap sheet can be implemented into practice and updates are made to the production view.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 12:
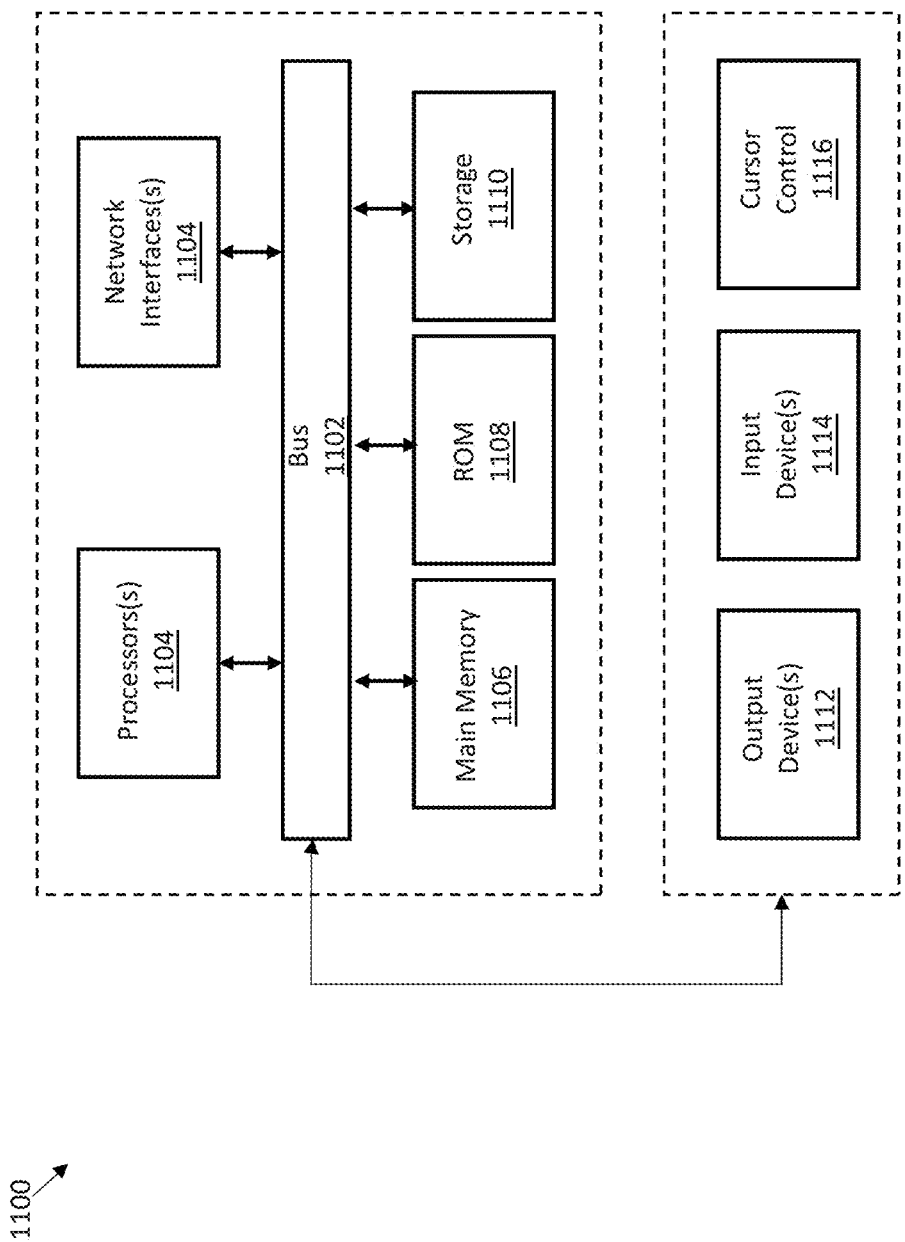
FIG. 12 is a block diagram that illustrates a computer system upon which any of the embodiments described herein may be implemented.

FIG. 12 is a block diagram that illustrates a computer system 1100 upon which any of the embodiments described herein may be implemented. The computer system 1100 includes a bus 1102 or other communication mechanism for communicating information, one or more hardware processors 1104 coupled with bus 1102 for processing information. Hardware processor(s) 1104 may be, for example, one or more general purpose microprocessors.

The computer system 1100 also includes a main memory 1106, such as a random access memory (RAM), cache and/or other dynamic storage devices, coupled to bus 1102 for storing information and instructions to be executed by processor 1104. Main memory 1106 also may be used for storing temporary variables or other intermediate information during execution of instructions to be executed by processor 1104. Such instructions, when stored in storage media accessible to processor 1104, render computer system 1100 into a special-purpose machine that is customized to perform the operations specified in the instructions.

The computer system 1100 further includes a read only memory (ROM) 1108 or other static storage device coupled to bus 1102 for storing static information and instructions for processor 1104. A storage device 1110, such as a magnetic disk, optical disk, or USB thumb drive (Flash drive), etc., is provided and coupled to bus 1102 for storing information and instructions.

The computer system 1100 may be coupled via bus 1102 to a display 1112, such as a cathode ray tube (CRT) or LCD display (or touch screen), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1100 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor(s) 1104 executing one or more sequences of one or more instructions contained in main memory 1106. Such instructions may be read into main memory 1106 from another storage medium, such as storage device 1110. Execution of the sequences of instructions contained in main memory 1106 causes processor(s) 1104 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1110. Volatile media includes dynamic memory, such as main memory 1106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may retrieves and executes the instructions. The instructions received by main memory 1106 may optionally be stored on storage device 1110 either before or after execution by processor 1104.

The computer system 1100 also includes a communication interface 518 coupled to bus 1102. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 1100, are example forms of transmission media.

The computer system 1100 can send messages and receive data, including program code, through the network(s), network link and communication interface 518. In the Internet example, a server might transmit a requested code for an application program through the Internet, the ISP, the local network and the communication interface 518.

The received code may be executed by processor 1104 as it is received, and/or stored in storage device 1110, or other non-volatile storage for later execution.

Each of the processes, methods, and algorithms described in the preceding sections may be embodied in, and fully or partially automated by, code modules executed by one or more
computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for management of a production pipeline, the method comprising:
   accessing a data model which comprises a plurality of data objects, including:
      one or more assembly objects, each assembly object representing a part to undergo one or more production events to be performed on a part at a first party facility for providing to a second party facility; and
      one or more production event objects, each production event object representing a particular production event and having a plurality of properties, including an associated start time property and an end time property;
   receiving, via a first interactive graphical user interface, selection of a first one or more production event objects to be linked to a first assembly object and an indication of values for at least the start time property and end time property of the first one or more production event objects;

receiving, via the first interactive graphical user interface, input of one or more alert conditions to be linked to the first assembly object;

causing display of a second interactive graphical user interface including at least the first assembly object and the first one or more production event objects linked to the first assembly object;

receiving, via the second interactive graphical user interface, first input data in relation to at first production event object of the first one or more production event objects, wherein the first input data modifies one or both of the start and end time values of the first production event object;

determining that the modification meets an alert condition linked to the first assembly object; and responsive to the determination, reconfiguring the second interactive graphical user interface to overlay an indication of an alert, with details associated with the alert, in a portion of the second interactive graphical user interface corresponding to the first assembly object and an associated production event object of the first one or more production event objects satisfying the alert condition.

2. The method of claim 1, further comprising causing the second interactive graphical user interface to be displayed on first and second computing systems, respectively associated with the first party and the second party, the second interactive graphical user interface including a status list including one or more entries, wherein each entry corresponds to an assembly object, including a first entry associated with the first assembly object and, associated with the first assembly object, an indication of the first one or more production event objects linked to the first assembly object, including their start and end time values.

3. The method of claim 2, wherein the first one or more production event objects are shown in chronological order in the second interactive graphical user interface.

4. The method of claim 3, wherein selection of the first one or more production event objects, including the indication of start time and end time values, and the input of alert conditions, are receivable from both of the first and second computing systems whilst being restricted to production event objects identified as performed at their own respective facilities.

5. The method of claim 4, wherein the first assembly object is linked to first and second sequential production event objects in which the start time value of the second production event object is dependent on the end time value of the first production event object, and the second production event object has a predetermined duration, wherein, responsive to the received first input data modifying the end time value of the first production event object, the start and end time values of the second production event object are automatically modified forwards or backwards in time by the predetermined duration and indicated on the second interactive graphical user interface.

6. The method of claim 5, wherein one of the first one or more production event objects linked to the first assembly object is a forecasted delivery time for an assembly object, having start and end times dependent on an end time of one or more preceding production event objects, and another of the first one or more production event objects is a requested delivery time slot, received from the second party for the first assembly object, and wherein the alert condition is such as to cause an alert to be issued if the forecasted delivery time is modified by the first input data so as to be outside of the requested delivery time slot.

7. The method of claim 6, further comprising receiving second input data from the second party which modifies the requested delivery time slot such that the current forecasted delivery time for the assembly object moves from inside to outside of the modified requested delivery time slot, and responsive thereto, causing an alert to be issued to the second interactive graphical user interface.

8. The method of claim 7, wherein the requested delivery slot object comprises a start time and an end time, and the predefined alert condition is such as cause an early alert to be issued if the forecasted delivery time is before the requested delivery slot start time and a late alert if after the requested delivery slot end time.

9. The method of claim 8, wherein the first input data is received from a computing system associated with the first party and corresponds to an updated status property of one of the first one or more production event objects.

10. The method of claim 9, wherein the updated status property of the first one or more production event object is indicative of the assembly failing one of a functional test and a quality control test.

11. The method of claim 10, wherein the updated status property is received automatically from a computerized testing system.

12. The method of claim 11, wherein the updated status property is indicative of the assembly not matching a requirement specification for the assembly provided by the second party.

13. The method of claim 12, wherein the updated status property has a corresponding delay time associated with said status property, which delay time is used to determine a modified end time for the first one or more production event object.

14. The method of claim 13, further comprising storing a log indicative of received input data in chronological order of receipt, including the first or second party from whom it was received.

15. The method of claim 1, further comprising:
receiving identification via the second interactive graphical user interface of an assembly object A having an alert indicative of a non-compliance event;
determining, using a second object model which maps assembly objects to one or more functionally-equivalent assembly objects, one or more second assembly objects B currently at the first party facility which is or are functionally-equivalent to the first assembly object;
indicating said functionally-equivalent assembly objects on the second interactive graphical user interface;
receiving, via the second interactive graphical user interface, selection of one of said second assembly objects B for replacing assembly object A; and
generating an updated second interactive graphical user interface showing the selected, second assembly object B in place of the assembly object A, including modified downstream effects to one or more other assembly objects and/or production event objects which are dependent on assembly object A, due to the replacement.

16. The method of claim 15, wherein, responsive to the selection, the assembly object A replaces the second assembly object B.

17. The method of claim 15, wherein, responsive to the selection, a swap list interface is generated for creation of a closed-loop set of replacements involving three or more functionally-equivalent assembly objects, the method further comprising receiving selection of another one of said second assembly objects B' to replace assembly object B, and so on until assembly object A is used to replace a replaced assembly object.

18. The method of claim 15, further comprising:
prior to receiving selection of one of said second assembly objects B:
determining a subset of said second assembly objects B which, if selected, would undo the non-compliance event for assembly object A; and
filtering the assembly objects displayed in the second interactive graphical user interface to enable only said subset to be selectable for replacing assembly object A.

19. The method of claim 18, wherein the updated second interactive graphical user interface is generated as a separate data object or file which replaces the previous second interactive graphical user interface after a confirm selection is received in relation to the updated second interactive graphical user interface.

20. A system comprising one or more processors and memory storing instruction, when executed by the one or more processors, is configured to:
provide a first data model which comprises a plurality of data objects, including:
one or more assembly objects, each assembly object representing a part to undergo one or more production events to be performed on a part at a first party facility for providing to a second party facility; and
one or more production event objects, each production event object representing a particular production event and having a plurality of properties, including an associated start time property and an end time property;
provide a first interactive graphical user interface that includes interactive selectable representations of at least some of the plurality of data objects;
receive, via the first interactive graphical user interface, one or more user inputs comprising drag and drop selections of the interactive selectable representations of a first one or more production event objects that cause the first one or more production event objects to be linked to a first assembly object;
receive, via the first interactive graphical user interface, an indication of values for at least the start time property and end time property of the first one or more production event objects that have been linked to the first assembly object;
receive, via the first interactive graphical user interface, input of one or more alert conditions to be linked to the first assembly object;
cause display of a second interactive graphical user interface including at least the first assembly object and the first one or more production event objects linked to the first assembly object;
receive, via the second interactive graphical user interface, first input data in relation to at first production event object of the first one or more production event objects, wherein the first input data that modifies one or both of the start and end time values of the first production event object;
determine that the modification meets an alert condition linked to the first assembly object; and
responsive to the determination, reconfigure the second interactive graphical user interface to overlay an indication of an alert, with details associated with the alert, in a portion of the second interactive graphical user interface corresponding to the first assembly object and an associated production event object of the first one or more production event objects satisfying the alert condition.

* * * * *